US012627020B2

(12) United States Patent
Saqueb et al.

(10) Patent No.: US 12,627,020 B2
(45) Date of Patent: May 12, 2026

(54) WAVEGUIDE WITH A CURVED-WALL LOW-PASS FILTER

(71) Applicant: Aptiv Technologies AG, Schaffhausen (CH)

(72) Inventors: Syed An Nazmus Saqueb, Westfield, IN (US); Biswadeep Das Gupta, Noblesville, IN (US); Navid Razi, Wuppertal (DE)

(73) Assignee: Aptiv Technologies AG, Schaffhausen (CH)

( * ) Notice: Subject to any disclaimer, the term of this patent is extended or adjusted under 35 U.S.C. 154(b) by 361 days.

(21) Appl. No.: 18/320,137

(22) Filed: May 18, 2023

(65) Prior Publication Data

US 2024/0387971 A1 Nov. 21, 2024

(51) Int. Cl.
*H01P 1/209* (2006.01)
*H01P 1/02* (2006.01)
*H01P 1/208* (2006.01)

(52) U.S. Cl.
CPC ............ *H01P 1/2088* (2013.01); *H01P 1/022* (2013.01); *H01P 1/209* (2013.01)

(58) Field of Classification Search
CPC ......... H01P 1/022; H01P 1/2088; H01P 1/209
USPC .................................................. 333/208–212
See application file for complete search history.

(56) References Cited

U.S. PATENT DOCUMENTS 2,851,686 A 9/1958 Hagaman
3,029,432 A 4/1962 Hansen
3,032,762 A 5/1962 Kerr
3,328,800 A 6/1967 Algeo
(Continued)

FOREIGN PATENT DOCUMENTS

CA 2654470 A1 12/2007
CN 1254446 A 5/2000
(Continued)

OTHER PUBLICATIONS

"Extended European Search Report", EP Application No. 18153137.7, Jun. 15, 2018, 8 pages.
"Extended European Search Report", EP Application No. 20155296.5, Jul. 13, 2020, 12 pages.
"Extended European Search Report", EP Application No. 20166797, Sep. 16, 2020, 11 pages.
(Continued)

*Primary Examiner* — Rakesh B Patel
(74) *Attorney, Agent, or Firm* — Harness, Dickey & Pierce, P.L.C.

(57) ABSTRACT

A waveguide with a curved-wall low-pass filter is described herein. The waveguide comprises a low-pass filter portion configured to allow low-frequency electromagnetic energy therethrough and reject high-frequency electromagnetic energy. The low-pass filter portion comprises an input port, an output port, and a cavity feature that is formed between the input port and the output port. The cavity feature has a greater depth than respective depths of the input port and the output port. The cavity feature comprises a bottom wall that achieves the greater depth for the cavity feature. The bottom wall comprises at least one curved portion configured to allow the cavity feature to achieve the allowance of the low-frequency electromagnetic energy and the rejection of the high-frequency electromagnetic energy. The cavity feature may allow the waveguide to have as good or better performance than traditional means while being easier to manufacture and/or taking up less space.

16 Claims, 8 Drawing Sheets

(56) References Cited

U.S. PATENT DOCUMENTS

| | | | |
|---|---|---|---|
| 3,462,713 | A | 8/1969 | Knerr |
| 3,473,162 | A | 10/1969 | Veith |
| 3,579,149 | A | 5/1971 | Ramsey |
| 3,594,806 | A | 7/1971 | Black et al. |
| 3,597,710 | A | 8/1971 | Levy |
| 3,852,689 | A | 12/1974 | Watson |
| 4,157,516 | A | 6/1979 | Grijp |
| 4,291,312 | A | 9/1981 | Kaloi |
| 4,453,142 | A | 6/1984 | Murphy |
| 4,562,416 | A | 12/1985 | Sedivec |
| 4,590,480 | A | 5/1986 | Nikolayuk et al. |
| 4,839,663 | A | 6/1989 | Kurtz |
| 5,030,965 | A | 7/1991 | Park et al. |
| 5,047,738 | A | 9/1991 | Wong et al. |
| 5,065,123 | A | 11/1991 | Heckaman et al. |
| 5,068,670 | A | 11/1991 | Maoz |
| 5,113,197 | A | 5/1992 | Luh |
| 5,337,065 | A | 8/1994 | Bonnet et al. |
| 5,350,499 | A | 9/1994 | Shibaike et al. |
| 5,541,612 | A | 7/1996 | Josefsson |
| 5,638,079 | A | 6/1997 | Kastner et al. |
| 5,923,225 | A | 7/1999 | Santos |
| 5,926,147 | A | 7/1999 | Sehm et al. |
| 5,982,256 | A | 11/1999 | Uchimura et al. |
| 5,986,527 | A | 11/1999 | Ishikawa et al. |
| 6,072,375 | A | 6/2000 | Adkins et al. |
| 6,166,701 | A | 12/2000 | Park et al. |
| 6,414,573 | B1 | 7/2002 | Swineford et al. |
| 6,489,855 | B1 | 12/2002 | Kitamori et al. |
| 6,535,083 | B1 | 3/2003 | Hageman et al. |
| 6,622,370 | B1 | 9/2003 | Sherman et al. |
| 6,788,918 | B2 | 9/2004 | Saitoh et al. |
| 6,794,950 | B2 | 9/2004 | Toit et al. |
| 6,859,114 | B2 | 2/2005 | Eleftheriades et al. |
| 6,867,660 | B2 | 3/2005 | Kitamori et al. |
| 6,958,662 | B1 | 10/2005 | Salmela et al. |
| 6,992,541 | B2 | 1/2006 | Wright et al. |
| 7,002,511 | B1 | 2/2006 | Ammar et al. |
| 7,091,919 | B2 | 8/2006 | Bannon |
| 7,142,165 | B2 | 11/2006 | Sanchez et al. |
| 7,420,442 | B1 | 9/2008 | Forman |
| 7,439,822 | B2 | 10/2008 | Shimura et al. |
| 7,495,532 | B2 | 2/2009 | McKinzie, III |
| 7,498,994 | B2 | 3/2009 | Vacanti |
| 7,626,476 | B2 | 12/2009 | Kim et al. |
| 7,659,799 | B2 | 2/2010 | Jun et al. |
| 7,886,434 | B1 | 2/2011 | Forman |
| 7,973,616 | B2 | 7/2011 | Shijo et al. |
| 7,994,879 | B2 | 8/2011 | Kim et al. |
| 8,013,694 | B2 | 9/2011 | Hiramatsu et al. |
| 8,089,327 | B2 | 1/2012 | Margomenos et al. |
| 8,159,316 | B2 | 4/2012 | Miyazato et al. |
| 8,395,552 | B2 | 3/2013 | Geiler et al. |
| 8,451,175 | B2 | 5/2013 | Gummalla et al. |
| 8,451,189 | B1 | 5/2013 | Fluhler |
| 8,576,023 | B1 | 11/2013 | Buckley et al. |
| 8,604,990 | B1 | 12/2013 | Chen et al. |
| 8,692,731 | B2 | 4/2014 | Lee et al. |
| 8,717,124 | B2 | 5/2014 | Vanhille et al. |
| 8,803,638 | B2 | 8/2014 | Kildal |
| 8,948,562 | B2 | 2/2015 | Norris et al. |
| 9,007,269 | B2 | 4/2015 | Lee et al. |
| 9,203,139 | B2 | 12/2015 | Zhu et al. |
| 9,203,155 | B2 | 12/2015 | Choi et al. |
| 9,246,204 | B1 | 1/2016 | Kabakian |
| 9,258,884 | B2 | 2/2016 | Saito |
| 9,356,238 | B2 | 5/2016 | Norris et al. |
| 9,368,878 | B2 | 6/2016 | Chen et al. |
| 9,450,281 | B2 | 9/2016 | Kim |
| 9,537,212 | B2 | 1/2017 | Rosen et al. |
| 9,647,313 | B2 | 5/2017 | Marconi et al. |
| 9,653,773 | B2 | 5/2017 | Ferrari et al. |
| 9,653,819 | B1 | 5/2017 | Izadian |
| 9,673,532 | B2 | 6/2017 | Cheng et al. |
| 9,806,393 | B2 | 10/2017 | Kildal et al. |
| 9,806,431 | B1 | 10/2017 | Izadian |
| 9,813,042 | B2 | 11/2017 | Xue et al. |
| 9,843,301 | B1 | 12/2017 | Rodgers et al. |
| 9,882,288 | B2 | 1/2018 | Black et al. |
| 9,935,065 | B1 | 4/2018 | Baheti et al. |
| 9,991,606 | B2 | 6/2018 | Kirino et al. |
| 9,997,842 | B2 | 6/2018 | Kirino et al. |
| 10,027,032 | B2 | 7/2018 | Kirino et al. |
| 10,042,045 | B2 | 8/2018 | Kirino et al. |
| 10,090,600 | B2 | 10/2018 | Kirino et al. |
| 10,114,067 | B2 | 10/2018 | Lam et al. |
| 10,153,533 | B2 | 12/2018 | Kirino |
| 10,158,158 | B2 | 12/2018 | Kirino et al. |
| 10,164,318 | B2 | 12/2018 | Seok et al. |
| 10,164,344 | B2 | 12/2018 | Kirino et al. |
| 10,186,787 | B1 | 1/2019 | Wang et al. |
| 10,218,078 | B2 | 2/2019 | Kirino et al. |
| 10,230,173 | B2 | 3/2019 | Kirino et al. |
| 10,263,310 | B2 | 4/2019 | Kildal et al. |
| 10,283,832 | B1 | 5/2019 | Chayat et al. |
| 10,312,596 | B2 | 6/2019 | Gregoire |
| 10,315,578 | B2 | 6/2019 | Kim et al. |
| 10,320,083 | B2 | 6/2019 | Kirino et al. |
| 10,333,227 | B2 | 6/2019 | Kirino et al. |
| 10,374,323 | B2 | 8/2019 | Kamo et al. |
| 10,381,317 | B2 | 8/2019 | Maaskant et al. |
| 10,381,741 | B2 | 8/2019 | Kirino et al. |
| 10,439,298 | B2 | 10/2019 | Kirino et al. |
| 10,468,736 | B2 | 11/2019 | Mangaiahgari |
| 10,505,282 | B2 | 12/2019 | Lilja |
| 10,534,061 | B2 | 1/2020 | Vassilev et al. |
| 10,559,889 | B2 | 2/2020 | Kirino et al. |
| 10,594,045 | B2 | 3/2020 | Kirino et al. |
| 10,601,144 | B2 | 3/2020 | Kamo et al. |
| 10,608,345 | B2 | 3/2020 | Kirino et al. |
| 10,613,216 | B2 | 4/2020 | Vacanti et al. |
| 10,622,696 | B2 | 4/2020 | Kamo et al. |
| 10,627,502 | B2 | 4/2020 | Kirino et al. |
| 10,649,461 | B2 | 5/2020 | Han et al. |
| 10,651,138 | B2 | 5/2020 | Kirino et al. |
| 10,651,567 | B2 | 5/2020 | Kamo et al. |
| 10,658,760 | B2 | 5/2020 | Kamo et al. |
| 10,670,810 | B2 | 6/2020 | Sakr et al. |
| 10,705,294 | B2 | 7/2020 | Guerber et al. |
| 10,707,584 | B2 | 7/2020 | Kirino et al. |
| 10,714,802 | B2 | 7/2020 | Kirino et al. |
| 10,727,561 | B2 | 7/2020 | Kirino et al. |
| 10,727,611 | B2 | 7/2020 | Kirino et al. |
| 10,763,590 | B2 | 9/2020 | Kirino et al. |
| 10,763,591 | B2 | 9/2020 | Kirino et al. |
| 10,775,573 | B1 | 9/2020 | Hsu et al. |
| 10,811,373 | B2 | 10/2020 | Zaman et al. |
| 10,826,147 | B2 | 11/2020 | Sikina et al. |
| 10,833,382 | B2 | 11/2020 | Sysouphat |
| 10,833,385 | B2 | 11/2020 | Mangaiahgari |
| 10,892,536 | B2 | 1/2021 | Fan et al. |
| 10,944,184 | B2 | 3/2021 | Shi et al. |
| 10,957,971 | B2 | 3/2021 | Doyle et al. |
| 10,957,988 | B2 | 3/2021 | Kirino et al. |
| 10,962,628 | B1 | 3/2021 | Laifenfeld et al. |
| 10,971,824 | B2 | 4/2021 | Baumgartner et al. |
| 10,983,194 | B1 | 4/2021 | Patel et al. |
| 10,985,434 | B2 | 4/2021 | Wagner et al. |
| 10,992,056 | B2 | 4/2021 | Kamo et al. |
| 11,061,110 | B2 | 7/2021 | Kamo et al. |
| 11,088,432 | B2 | 8/2021 | Seok et al. |
| 11,088,464 | B2 | 8/2021 | Sato et al. |
| 11,114,733 | B2 | 9/2021 | Doyle et al. |
| 11,121,441 | B1 | 9/2021 | Rmili et al. |
| 11,121,475 | B2 | 9/2021 | Yang et al. |
| 11,169,325 | B2 | 11/2021 | Guerber et al. |
| 11,171,399 | B2 | 11/2021 | Alexanian et al. |
| 11,196,171 | B2 | 12/2021 | Doyle et al. |
| 11,201,414 | B2 | 12/2021 | Doyle et al. |
| 11,249,011 | B2 | 2/2022 | Challener |
| 11,283,162 | B2 | 3/2022 | Doyle et al. |
| 11,289,787 | B2 | 3/2022 | Yang |
| 11,349,183 | B2 | 5/2022 | Rahiminejad et al. |
| 11,349,220 | B2 | 5/2022 | Alexanian et al. |

(56) References Cited

U.S. PATENT DOCUMENTS

| | | | |
|---|---|---|---|
| 11,378,683 B2 | 7/2022 | Alexanian et al. | |
| 11,411,292 B2 | 8/2022 | Kirino | |
| 11,444,364 B2 | 9/2022 | Shi | |
| 11,495,871 B2 | 11/2022 | Vosoogh et al. | |
| 11,563,259 B2 | 1/2023 | Alexanian et al. | |
| 11,611,138 B2 | 3/2023 | Ogawa et al. | |
| 11,616,282 B2 | 3/2023 | Yao et al. | |
| 11,626,652 B2 | 4/2023 | Vilenskiy et al. | |
| 2002/0021197 A1 | 2/2002 | Elco | |
| 2003/0052828 A1 | 3/2003 | Scherzer et al. | |
| 2004/0041663 A1 | 3/2004 | Uchimura et al. | |
| 2004/0069984 A1 | 4/2004 | Estes et al. | |
| 2004/0090290 A1 | 5/2004 | Teshirogi et al. | |
| 2004/0174315 A1 | 9/2004 | Miyata | |
| 2005/0146474 A1 | 7/2005 | Bannon | |
| 2005/0237253 A1 | 10/2005 | Kuo et al. | |
| 2006/0038724 A1 | 2/2006 | Tikhov et al. | |
| 2006/0113598 A1 | 6/2006 | Chen et al. | |
| 2006/0158382 A1 | 7/2006 | Nagai | |
| 2007/0013598 A1 | 1/2007 | Artis et al. | |
| 2007/0054064 A1 | 3/2007 | Ohmi et al. | |
| 2007/0103381 A1 | 5/2007 | Upton | |
| 2008/0129409 A1 | 6/2008 | Nagaishi et al. | |
| 2008/0150821 A1 | 6/2008 | Koch et al. | |
| 2009/0040132 A1 | 2/2009 | Sridhar et al. | |
| 2009/0207090 A1 | 8/2009 | Pettus et al. | |
| 2009/0243762 A1 | 10/2009 | Chen et al. | |
| 2009/0243766 A1 | 10/2009 | Miyagawa et al. | |
| 2009/0300901 A1 | 12/2009 | Artis et al. | |
| 2010/0134376 A1 | 6/2010 | Margomenos et al. | |
| 2010/0308938 A1* | 12/2010 | Arregui Padilla | H01P 1/207<br>333/211 |
| 2010/0321265 A1 | 12/2010 | Yamaguchi et al. | |
| 2011/0181482 A1 | 7/2011 | Adams et al. | |
| 2012/0013421 A1 | 1/2012 | Hayata | |
| 2012/0050125 A1 | 3/2012 | Leiba et al. | |
| 2012/0056776 A1 | 3/2012 | Shijo et al. | |
| 2012/0068316 A1 | 3/2012 | Ligander | |
| 2012/0163811 A1 | 6/2012 | Doany et al. | |
| 2012/0194399 A1 | 8/2012 | Bily et al. | |
| 2012/0242421 A1 | 9/2012 | Robin et al. | |
| 2012/0256796 A1 | 10/2012 | Leiba | |
| 2012/0280770 A1 | 11/2012 | Abhari et al. | |
| 2013/0057358 A1 | 3/2013 | Anthony et al. | |
| 2013/0082801 A1 | 4/2013 | Rofougaran et al. | |
| 2013/0300602 A1 | 11/2013 | Zhou et al. | |
| 2014/0015709 A1 | 1/2014 | Shijo et al. | |
| 2014/0091884 A1 | 4/2014 | Flatters | |
| 2014/0106684 A1 | 4/2014 | Burns et al. | |
| 2014/0327491 A1 | 11/2014 | Kim et al. | |
| 2015/0097633 A1 | 4/2015 | Devries et al. | |
| 2015/0229017 A1 | 8/2015 | Suzuki et al. | |
| 2015/0229027 A1 | 8/2015 | Sonozaki et al. | |
| 2015/0263429 A1 | 9/2015 | Vahidpour et al. | |
| 2015/0333726 A1 | 11/2015 | Xue et al. | |
| 2015/0357698 A1 | 12/2015 | Kushta | |
| 2015/0364804 A1 | 12/2015 | Tong et al. | |
| 2015/0364830 A1 | 12/2015 | Tong et al. | |
| 2016/0043455 A1 | 2/2016 | Seler et al. | |
| 2016/0049714 A1 | 2/2016 | Ligander et al. | |
| 2016/0056541 A1 | 2/2016 | Tageman et al. | |
| 2016/0118705 A1 | 4/2016 | Tang et al. | |
| 2016/0126637 A1 | 5/2016 | Uemichi | |
| 2016/0195612 A1 | 7/2016 | Shi | |
| 2016/0204495 A1 | 7/2016 | Takeda et al. | |
| 2016/0211582 A1 | 7/2016 | Saraf | |
| 2016/0276727 A1 | 9/2016 | Dang et al. | |
| 2016/0293557 A1 | 10/2016 | Topak et al. | |
| 2016/0301125 A1 | 10/2016 | Kim et al. | |
| 2017/0003377 A1 | 1/2017 | Menge | |
| 2017/0012335 A1 | 1/2017 | Boutayeb | |
| 2017/0084554 A1 | 3/2017 | Dogiamis et al. | |
| 2017/0288313 A1 | 10/2017 | Chung et al. | |
| 2017/0294719 A1 | 10/2017 | Tatomir | |
| 2017/0324135 A1 | 11/2017 | Blech et al. | |
| 2018/0013208 A1 | 1/2018 | Izadian et al. | |
| 2018/0032822 A1 | 2/2018 | Frank et al. | |
| 2018/0123245 A1 | 5/2018 | Toda et al. | |
| 2018/0131084 A1 | 5/2018 | Park et al. | |
| 2018/0212324 A1 | 7/2018 | Tatomir | |
| 2018/0226709 A1 | 8/2018 | Mangaiahgari | |
| 2018/0233465 A1 | 8/2018 | Spella et al. | |
| 2018/0254563 A1 | 9/2018 | Sonozaki et al. | |
| 2018/0284186 A1 | 10/2018 | Chadha et al. | |
| 2018/0301819 A1 | 10/2018 | Kirino et al. | |
| 2018/0301820 A1 | 10/2018 | Bregman et al. | |
| 2018/0343711 A1 | 11/2018 | Wixforth et al. | |
| 2018/0351261 A1 | 12/2018 | Kamo et al. | |
| 2018/0375185 A1 | 12/2018 | Kirino et al. | |
| 2019/0006743 A1 | 1/2019 | Kirino et al. | |
| 2019/0013563 A1 | 1/2019 | Takeda et al. | |
| 2019/0057945 A1 | 2/2019 | Maaskant et al. | |
| 2019/0109361 A1 | 4/2019 | Ichinose et al. | |
| 2019/0115644 A1 | 4/2019 | Wang et al. | |
| 2019/0187247 A1 | 6/2019 | Izadian et al. | |
| 2019/0245276 A1 | 8/2019 | Li et al. | |
| 2019/0252778 A1 | 8/2019 | Duan | |
| 2019/0260137 A1 | 8/2019 | Watanabe et al. | |
| 2019/0324134 A1 | 10/2019 | Cattle | |
| 2020/0021001 A1 | 1/2020 | Mangaiahgari | |
| 2020/0044360 A1 | 2/2020 | Kamo et al. | |
| 2020/0059002 A1 | 2/2020 | Renard et al. | |
| 2020/0064483 A1 | 2/2020 | Li et al. | |
| 2020/0076086 A1 | 3/2020 | Cheng et al. | |
| 2020/0106171 A1 | 4/2020 | Shepeleva et al. | |
| 2020/0112077 A1 | 4/2020 | Kamo et al. | |
| 2020/0166637 A1 | 5/2020 | Hess et al. | |
| 2020/0203849 A1 | 6/2020 | Lim et al. | |
| 2020/0212594 A1 | 7/2020 | Kirino et al. | |
| 2020/0235453 A1 | 7/2020 | Lang | |
| 2020/0280986 A1* | 9/2020 | Peterson | H04W 88/08 |
| 2020/0284907 A1 | 9/2020 | Gupta et al. | |
| 2020/0287293 A1 | 9/2020 | Shi et al. | |
| 2020/0319293 A1 | 10/2020 | Kuriyama et al. | |
| 2020/0343612 A1 | 10/2020 | Shi | |
| 2020/0346581 A1 | 11/2020 | Lawson et al. | |
| 2020/0373678 A1 | 11/2020 | Park et al. | |
| 2021/0028528 A1 | 1/2021 | Alexanian et al. | |
| 2021/0036393 A1 | 2/2021 | Mangaiahgari | |
| 2021/0104818 A1 | 4/2021 | Li et al. | |
| 2021/0110217 A1 | 4/2021 | Gunel | |
| 2021/0159577 A1 | 5/2021 | Carlred et al. | |
| 2021/0218154 A1 | 7/2021 | Shi et al. | |
| 2021/0242581 A1 | 8/2021 | Rossiter et al. | |
| 2021/0249777 A1 | 8/2021 | Alexanian et al. | |
| 2021/0305667 A1 | 9/2021 | Bencivenni | |
| 2022/0094071 A1 | 3/2022 | Doyle et al. | |
| 2022/0109246 A1 | 4/2022 | Emanuelsson et al. | |
| 2022/0196794 A1 | 6/2022 | Foroozesh et al. | |

FOREIGN PATENT DOCUMENTS

| | | | |
|---|---|---|---|
| CN | 1620738 | A | 5/2005 |
| CN | 2796131 | | 7/2006 |
| CN | 101584080 | A | 11/2009 |
| CN | 201383535 | | 1/2010 |
| CN | 201868568 | U | 6/2011 |
| CN | 102157787 | A | 8/2011 |
| CN | 102420352 | A | 4/2012 |
| CN | 103326125 | A | 9/2013 |
| CN | 203277633 | U | 11/2013 |
| CN | 103490168 | A | 1/2014 |
| CN | 103515682 | A | 1/2014 |
| CN | 102142593 | B | 6/2014 |
| CN | 104101867 | A | 10/2014 |
| CN | 104900956 | A | 9/2015 |
| CN | 104993254 | A | 10/2015 |
| CN | 105071019 | A | 11/2015 |
| CN | 105609909 | A | 5/2016 |
| CN | 105680133 | A | 6/2016 |
| CN | 105958167 | A | 9/2016 |
| CN | 107317075 | A | 11/2017 |
| CN | 108258392 | A | 7/2018 |
| CN | 109286081 | A | 1/2019 |

(56) References Cited

FOREIGN PATENT DOCUMENTS

| | | | |
|---|---|---|---|
| CN | 109643856 | A | 4/2019 |
| CN | 109980361 | A | 7/2019 |
| CN | 110085990 | A | 8/2019 |
| CN | 209389219 | U | 9/2019 |
| CN | 110401022 | A | 11/2019 |
| CN | 111123210 | A | 5/2020 |
| CN | 111480090 | A | 7/2020 |
| CN | 108376821 | B | 10/2020 |
| CN | 111 987 403 | A | 11/2020 |
| CN | 110474137 | B | 11/2020 |
| CN | 109326863 | B | 12/2020 |
| CN | 112241007 | A | 1/2021 |
| CN | 212604823 | U | 2/2021 |
| CN | 112986951 | A | 6/2021 |
| CN | 112290182 | B | 7/2021 |
| CN | 113193323 | B | 10/2021 |
| CN | 214706247 | U | 11/2021 |
| DE | 112017006415 | | 9/2019 |
| DE | 102019200893 | A1 | 7/2020 |
| EP | 0174579 | A2 | 3/1986 |
| EP | 0818058 | A1 | 1/1998 |
| EP | 2267841 | A1 | 12/2010 |
| EP | 2500978 | A1 | 9/2012 |
| EP | 2843758 | A1 | 3/2015 |
| EP | 2766224 | B1 | 12/2018 |
| EP | 3460903 | A1 | 3/2019 |
| EP | 3785995 | A1 | 3/2021 |
| EP | 3862773 | A1 | 8/2021 |
| EP | 4089840 | A1 | 11/2022 |
| GB | 893008 | A | 4/1962 |
| GB | 2463711 | A | 3/2010 |
| GB | 2489950 | A | 10/2012 |
| IT | MI20 130 710 | A1 | 10/2014 |
| JP | 2000183222 | A | 6/2000 |
| JP | 2003198242 | A | 7/2003 |
| JP | 2003289201 | A | 10/2003 |
| JP | 5269902 | B2 | 8/2013 |
| JP | 2013187752 | A | 9/2013 |
| JP | 2015216533 | A | 12/2015 |
| KR | 20080044752 | A | 5/2008 |
| KR | 1020080044752 | A | 5/2008 |
| KR | 20080105396 | A | 12/2008 |
| KR | 101092846 | B1 | 12/2011 |
| KR | 102154338 | B1 | 9/2020 |
| WO | 9934477 | A1 | 7/1999 |
| WO | 2013189513 | A1 | 12/2013 |
| WO | 2018003932 | A1 | 1/2018 |
| WO | 2018052335 | A1 | 3/2018 |
| WO | 2019085368 | A1 | 5/2019 |
| WO | 2020082363 | A1 | 4/2020 |
| WO | 2021072380 | A1 | 4/2021 |
| WO | 2022122319 | A1 | 6/2022 |
| WO | 2022225804 | A1 | 10/2022 |

OTHER PUBLICATIONS

"Extended European Search Report", EP Application No. 21211165.2, May 13, 2022, 12 pages.
"Extended European Search Report", EP Application No. 21211167.8, May 19, 2022, 10 pages.
"Extended European Search Report", EP Application No. 21211168.6, May 13, 2022, 11 pages.
"Extended European Search Report", EP Application No. 21211452.4, May 16, 2022, 10 pages.
"Extended European Search Report", EP Application No. 21211474.8, Apr. 20, 2022, 14 pages.
"Extended European Search Report", EP Application No. 21211478.9, May 19, 2022, 10 pages.
"Extended European Search Report", EP Application No. 21212703.9, May 3, 2022, 13 pages.
"Extended European Search Report", EP Application No. 21216319.0, Jun. 10, 2022, 12 pages.
"Extended European Search Report", EP Application No. 22160898.7, Aug. 4, 2022, 11 pages.
"Extended European Search Report", EP Application No. 22166998.9, Sep. 9, 2022, 12 pages.
"Extended European Search Report", EP Application No. 22184924.3, Dec. 2, 2022, 13 pages.
"Extended European Search Report", EP Application No. 23158037.4, Aug. 17, 2023, 9 pages.
"Extended European Search Report", EP Application No. 23158947.4, Aug. 17, 2023, 11 pages.
"Foreign Office Action", CN Application No. 201810122408.4, Jun. 2, 2021, 15 pages.
"Foreign Office Action", CN Application No. 201810122408.4, Oct. 18, 2021, 19 pages.
"Foreign Office Action", CN Application No. 202010146513.9, Feb. 7, 2022, 14 pages.
"Foreign Office Action", CN Application No. 202111550163.3, Jun. 17, 2023, 25 pages.
"Foreign Office Action", CN Application No. 202111550448.7, Jun. 17, 2023, 19 pages.
"Foreign Office Action", CN Application No. 202111551711.4, Jun. 17, 2023, 29 pages.
"Foreign Office Action", CN Application No. 202111551878.0, Jun. 15, 2023, 20 pages.
"Foreign Office Action", CN Application No. 202111563233.9, May 31, 2023, 15 pages.
"Foreign Office Action", CN Application No. 202111652507.1, Jun. 26, 2023, 14 pages.
"Foreign Office Action", CN Application No. 202210251362.2, Jun. 28, 2023, 15 pages.
"WR-90 Waveguides", Pasternack Enterprises, Inc., 2016, Retrieved from https://web.archive.org/web/20160308205114/http://www.pasternack.com:80/wr-90-waveguides-category.aspx, 2 pages.
Adams, et al., "Dual Band Frequency Scanned, Height Finder Antenna", 1991 21st European Microwave Conference, 1991, 6 pages.
Alhuwaimel, et al., "Performance Enhancement of a Slotted Waveguide Antenna by Utilizing Parasitic Elements", 2015 IEEE-APS Topical Conference on Antennas and Propagation in Wireless Communications (APWC), Oct. 19, 2015, 4 pages.
Bauer, et al., "A wideband transition from substrate integrated waveguide to differential microstrip lines in multilayer substrates", Sep. 2010, pp. 811-813.
Chaloun, et al., "A Wideband 122 GHz Cavity-Backed Dipole Antenna for Millimeter-Wave Radar Altimetry", 2020 14th European Conference on Antennas and Propagation (EUCAP), Mar. 15, 2020, 4 pages.
Deutschmann, et al., "A Full W-Band Waveguide-to-Differential Microstrip Transition", Jun. 2019, pp. 335-338.
Ghassemi, et al., "Millimeter-Wave Integrated Pyramidal Horn Antenna Made of Multilayer Printed Circuit Board (PCB) Process", IEEE Transactions on Antennas and Propagation, vol. 60, No. 9, Sep. 2012, pp. 4432-4435.
Giese, et al., "Compact Wideband Single-ended and Differential Microstrip-to-waveguide Transitions at W-band", Jul. 2015, 4 pages.
Gray, et al., "Carbon Fibre Reinforced Plastic Slotted Waveguide Antenna", Proceedings of Asia-Pacific Microwave Conference 2010, pp. 307-310.
Hansen, et al., "D-Band FMCW Radar Sensor for Industrial Wideband Applications with Fully-Differential MMIC-to-RWG Interface in SIW", 2021 IEEE/MTT-S International Microwave Symposium, Jun. 7, 2021, pp. 815-818.
Hasan, et al., "F-Band Differential Microstrip Patch Antenna Array and Waveguide to Differential Microstrip Line Transition for FMCW Radar Sensor", IEEE Sensors Journal, vol. 19, No. 15, Aug. 1, 2019, pp. 6486-6496.
Hausman, "Termination Insensitive Mixers", 2011 IEEE International Conference on Microwaves, Communications, Antennas and Electronic Systems (COMCAS 2011), Nov. 7, 2011, 13 pages.
Hausman, et al., "Termination Insensitive Mixers", 2011 IEEE International Conference on Microwaves, Communications, Antennas and Electronic Systems (COMCAS 2011), Dec. 19, 2011, 13 pages.

(56) References Cited

OTHER PUBLICATIONS

Huang, et al., "The Rectangular Waveguide Board Wall Slot Array Antenna Integrated with One Dimensional Subwavelength Periodic Corrugated Grooves and Artificially Soft Surface Structure", Dec. 20, 2008, 10 pages.
Jankovic, et al., "Stepped Bend Substrate Integrated Waveguide to Rectangular Waveguide Transitions", Jun. 2016, 2 pages.
Li, et al., "Millimetre-wave slotted array antenna based on double-layer substrate integrated waveguide", Jun. 1, 2015, pp. 882-888.
Mak, et al., "A Magnetoelectric Dipole Leaky-Wave Antenna for Millimeter-Wave Application", IEEE Transactions on Antennas and Propagation, vol. 65, No. 12, Dec. 2017, Jul. 3, 2017, pp. 6395-6402.
Mallahzadeh, et al., "A Low Cross-Polarization Slotted Ridged SIW Array Antenna Design With Mutual Coupling Considerations", Jul. 17, 2015, pp. 4324-4333.
Ogiwara, et al., "2-D MoM Analysis of the Choke Structure for Isolation Improvement between Two Waveguide Slot Array Antennas", Proceedings of Asia-Pacific Microwave Conference 2007, 4 pages.
Razmhosseini, et al., "Parasitic Slot Elements for Bandwidth Enhancement of Slotted Waveguide Antennas", 2019 IEEE 90th Vehicular Technology Conference, Sep. 2019, 5 pages.
Rossello, et al., "Substrate Integrated Waveguide Aperture Coupled Patch Antenna Array for 24 GHz Wireless Backhaul and Radar Applications", Nov. 16, 2014, 2 pages.
Schneider, et al., "A Low-Loss W-Band Frequency-Scanning Antenna for Wideband Multichannel Radar Applications", IEEE Antennas and Wireless Propagation Letters, vol. 18, No. 4, Apr. 2019, pp. 806-810.
Shehab, et al., "Substrate-Integrated-Waveguide Power Dividers", Oct. 15, 2019, pp. 27-38.
Tong, et al., "A Wide Band Transition from Waveguide to Differential Microstrip Lines", Dec. 2008, 5 pages.
Peverini Oscar Antonio et al: "Enhanced Topology of SES-Plane Resonators for High-Power Satellite Applications", IEEE Transactions on Microwave Theory and Techniques, IEEE, USA, vol. 63, No. 10, Oct. 1, 2015 (Oct. 1, 2015), pp. 3361-3373, XP011670683, ISSN: 0018-9480, DOI: 10.1109/TMTT.2015.2462839 [retrieved on Oct. 2, 2015].
Extended European Search Report regarding Application No. 23182496.2, dated Dec. 8, 2023.
Aulia Dewantari et al., "Flared SIW antenna design and transceiving experiments for W-band SAR", International Journal of RF and Microwave Computer-Aided Engineering, Wiley Interscience, Hoboken, USA, vol. 28, No. 9, May 9, 2018, XP072009558.
"Extended European Search Report", EP Application No. 21215901.6, Jun. 9, 2022, 8 pages.
"Extended European Search Report", EP Application No. 22183888.1, Dec. 20, 2022, 10 pages.
"Extended European Search Report", EP Application No. 22183892.3, Dec. 2, 2022, 8 pages.
Furtula, et al., "Waveguide Bandpass Filters for Millimeter-Wave Radiometers", Journal of Infrared, Millimeter and Terahertz Waves, 2013, 9 pages.
Lin, et al., "A THz Waveguide Bandpass Filter Design Using an Artificial Neural Network", Micromachines 13(6), May 2022, 11 pages.
Serrano, et al., "Lowpass Filter Design for Space Applications in Waveguide Technology Using Alternative Topologies", Jan. 2013, 117 pages.
Wang, et al., "A 79-GHz LTCC differential microstrip line to laminated waveguide transition using high permittivity material", Dec. 2010, pp. 1593-1596.
Wang, et al., "Low-loss frequency scanning planar array with hybrid feeding structure for low-altitude detection radar", Sep. 13, 2019, pp. 6708-6711.
Wang, et al., "Mechanical and Dielectric Strength of Laminated Epoxy Dielectric Graded Materials", Mar. 2020, 15 pages.
Wu, et al., "A Planar W-Band Large-Scale High-Gain Substrate-Integrated Waveguide Slot Array", Feb. 3, 2020, pp. 6429-6434.
Wu, et al., "The Substrate Integrated Circuits—A New Concept for High-Frequency Electronics and Optoelectronics", Dec. 2003, 8 pages.
Xu, et al., "CPW Center-Fed Single-Layer SIW Slot Antenna Array for Automotive Radars", Jun. 12, 2014, pp. 4528-4536.
Yu, et al., "Optimization and Implementation of SIW Slot Array for Both Medium- and Long-Range 77 GHz Automotive Radar Application", IEEE Transactions on Antennas and Propagation, vol. 66, No. 7, Jul. 2018, pp. 3769-3774.
Yuasa, et al., "A millimeter wave wideband differential line to waveguide transition using short ended slot line", Oct. 2014, pp. 1004-1007.

* cited by examiner

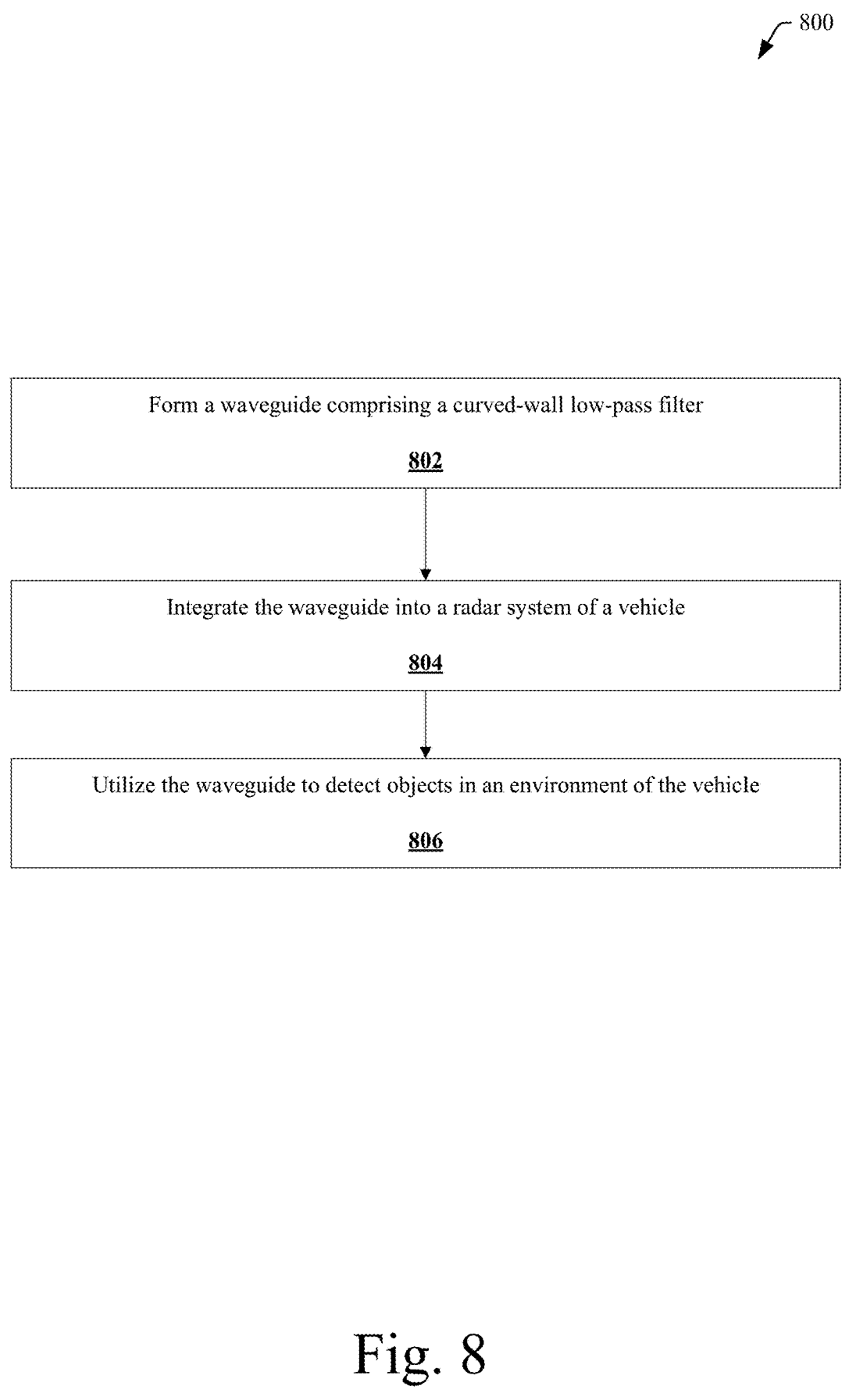

800

Form a waveguide comprising a curved-wall low-pass filter

802

Integrate the waveguide into a radar system of a vehicle

804

Utilize the waveguide to detect objects in an environment of the vehicle

806

Fig. 8

WAVEGUIDE WITH A CURVED-WALL LOW-PASS FILTER

BACKGROUND

Some devices (e.g., radar devices) use electromagnetic (EM) signals to detect and track objects. The EM signals are transmitted and received using antennas which may be characterized in terms of gains, beam widths, or, more specifically, in terms of antenna patterns, which are measures of the antenna gains as functions of directions. Waveguides are often used to change or improve the antenna patterns.

Waveguides often have various structures designed to guide, balance, or filter the EM signals. For example, a filter may be used to keep undesired signals from entering a portion of a waveguide. These filters are often hard to manufacture and/or are long structures in order to achieve good rejection properties, which makes them potentially expensive options in both cost and/or space.

SUMMARY

This document is directed to a waveguide with a curved-wall low-pass filter. Some aspects described below include a waveguide comprising a low-pass filter portion configured to allow low-frequency electromagnetic energy therethrough and reject high-frequency electromagnetic energy. The low-pass filter portion comprises: an input port; an output port; and a cavity feature formed between the input port and the output port. The cavity feature has a greater depth than respective depths of the input port and the output port. The cavity feature comprises a top wall and a bottom wall that is disposed opposite the top wall, that achieves the greater depth for the cavity feature. The bottom wall comprises at least one curved portion configured to allow the cavity feature to achieve the allowance of the low-frequency electromagnetic energy and the rejection of the high-frequency electromagnetic energy.

In some implementations, a length of the cavity feature between the input port and the output port may be less than two times an operating wavelength.

In some implementations, the greater depth of the cavity feature may be approximately an operating wavelength.

In some implementations, the greater depth of the cavity feature may be approximately half a length of the cavity feature.

In some implementations, the input port and the output port may have different depths. The top wall may comprise a jog portion between two parallel portions to achieve the different depths. The jog portion may be halfway between the input port and the output port or offset from a halfway point between the input port and the output port.

In some implementations, the bottom wall may further comprise a flat portion that is parallel to at least a portion of the top wall, the flat portion providing the greater depth. The bottom wall may further comprise a first curved portion that connects the input port to the flat portion and a second curved portion that connects the output port to the flat portion. The first curved portion and the second curved portion may be cylindrical. A first end of the first curved portion may be tangent with the input port, and a first end of the second curved portion may be tangent with the output port. A second end of the first curved portion may be substantially normal with the flat portion, and a second end of the second curved portion may be substantially normal with the flat portion.

In some implementations, the bottom wall may be elliptical to form the greater depth. A first end of the bottom wall may be substantially normal with the input port, and a second end of the bottom wall may be substantially normal with the output port.

In some implementations, the bottom wall may comprise a first elliptical portion and a second elliptical portion, where the first and second elliptical portions form the greater depth. A first end of the first elliptical portion may be substantially normal with the input port, and a second the second elliptical portion may be substantially normal with the output port. The first elliptical portion and the second elliptical portion may meet forming an extension portion that extends towards the top wall away from the greater depth. The extension portion may extend less than half a distance from a bottom extent of the bottom wall to the input port or output port.

Other aspects described below include a system comprising a processor configured to generate low-frequency electromagnetic energy and a waveguide as described above that is configured to guide the low-frequency electromagnetic energy and reject high-frequency electromagnetic energy.

This Summary introduces simplified concepts of a waveguide with a curved-wall low-pass filter that is further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

A waveguide with a curved-wall low-pass filter is described with reference to the following drawings that use some of the same numbers throughout to reference like or examples of like features and components.

FIG. 8 illustrates, in accordance with this disclosure, an example method of forming and implementing a waveguide with a curved-wall low-pass filter.

DETAILED DESCRIPTION

Waveguides often have various structures designed to guide, balance, or filter EM signals. For example, a filter may be used to keep undesired signals (e.g., higher frequency signals) from entering a portion of a waveguide (e.g., one configured for lower-frequency signals). Such filters are often hard to manufacture and/or are long structures in order to achieve good rejection properties, which makes them potentially expensive options in both cost and/or space.

For example, thin iris filters are often implemented in waveguides; however, they require fine machining, which may be expensive. Stepped impedance filters do not require irises; however, they are very long structures, which means that they are often space prohibitive. Further, notch filters have been developed; however, they often have very narrow rejection bands.

A waveguide with a curved-wall low-pass filter is described herein. The waveguide comprises a low-pass filter portion configured to allow low-frequency electromagnetic energy therethrough and reject high-frequency electromagnetic energy. The low-pass filter portion comprises an input port, an output port, and a cavity feature that is formed between the input port and the output port. The cavity feature has a greater depth than respective depths of the input port and the output port. The cavity feature comprises a bottom wall that achieves the greater depth for the cavity feature. The bottom wall comprises at least one curved portion configured to allow the cavity feature to achieve the allowance of the low-frequency electromagnetic energy and the rejection of the high-frequency electromagnetic energy.

The cavity feature may allow the waveguide to have as good or better performance than conventional means (e.g., at least 10 dB rejection within 2 gigahertz (GHz) and for a bandwidth of at least 5 GHz) while being easier to manufacture and/or taking up less space. Doing so may save costs while also allowing for a smaller footprint on the vehicles in which the waveguide is deployed.

Figure 1:
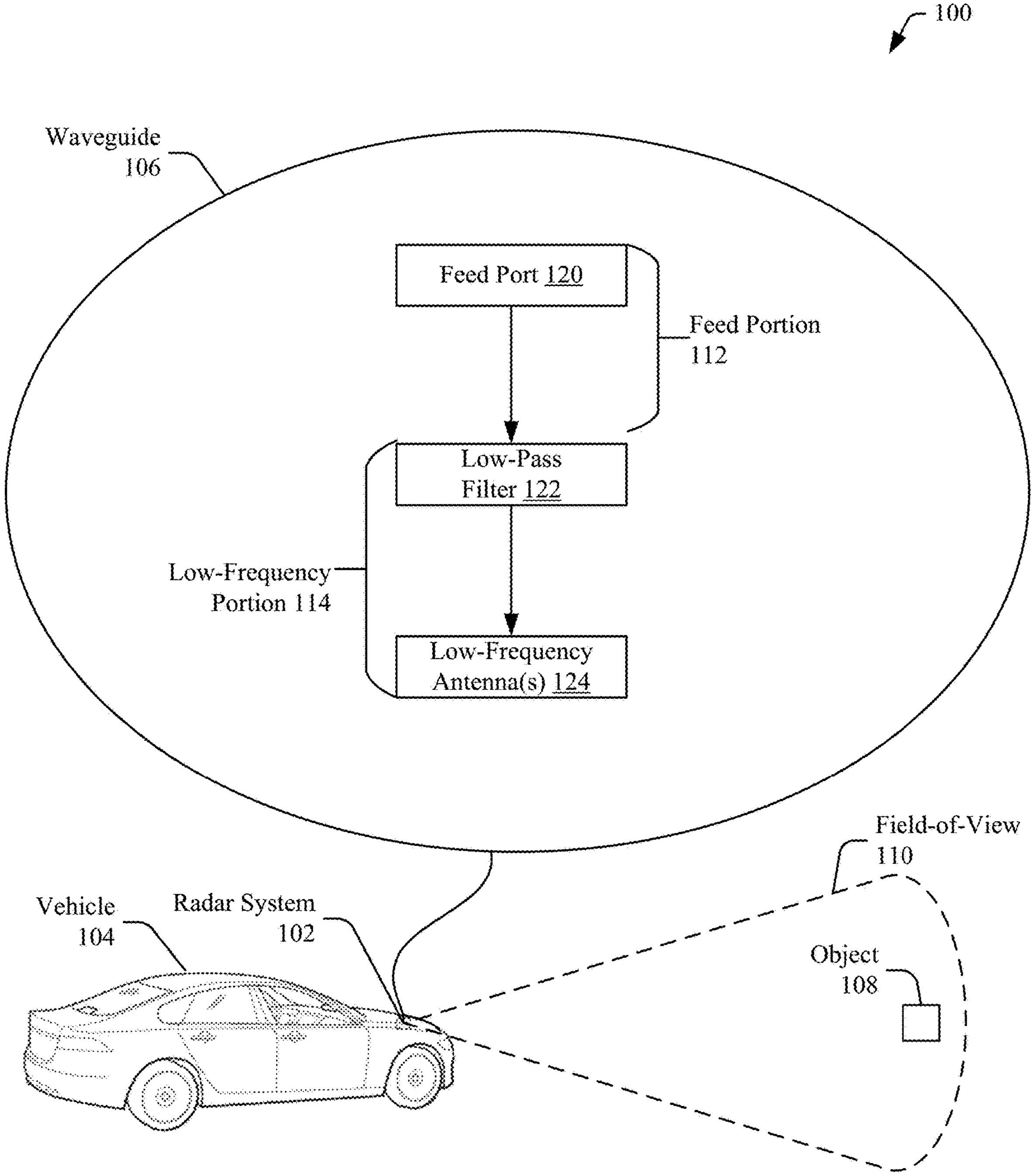
FIG. 1 illustrates, in accordance with this disclosure, an example environment where a waveguide with a curved-wall low-pass filter may be used.

FIG. 1 illustrates an example environment 100 where a waveguide with a curved-wall low-pass filter may be used. Example environment 100 contains a radar system 102 that is disposed within, disposed on, or dispersed throughout a vehicle 104. The radar system 102 contains a waveguide 106 (e.g., a waveguide with a curved-wall low-pass filter) that may be used by the radar system 102 to perform various sensing tasks related to object(s) 108 that are within a fields-of-view 110 of the radar system 102.

Although illustrated as a car, the vehicle 104 may represent other types of motorized vehicles (e.g., a motorcycle, a bus, a tractor, a semi-trailer truck, construction equipment), non-motorized vehicles (e.g., a bicycle), railed vehicles (e.g., a train or a trolley car), watercraft (e.g., a boat or a ship), aircraft (e.g., an airplane or a helicopter), or spacecraft (e.g., satellite). In general, manufacturers may mount the radar system 102 to any moving platform, including moving machinery or robotic equipment. In other implementations, other devices (e.g., desktop computers, tablets, laptops, televisions, computing watches, smartphones, gaming systems) may incorporate the radar system 102 with the waveguide 106 and support techniques described herein.

The radar system 102 also includes one or more processors (not illustrated) and computer-readable storage media (CRM) (not illustrated). The processor may be a microprocessor or a system-on-chip. The processor executes instructions stored within the CRM. As an example, the processor controls the operation of a transmitter (not illustrated) that is connected to waveguide 106. The processor may also process signals (EM signals/energy) received via the waveguide 106 and determine information about the objects 108. The processor may also generate radar data for the automotive systems. For example, the processor controls or directs operations of an autonomous or semi-autonomous driving system of vehicle 104. In some implementations, the radar system 102 may include a monolithic microwave integrated circuit (MMIC) that interfaces with the waveguide 106.

In example environment 100, the radar system 102 may detect and track the objects 108 by operating in different frequency modes and/or polarizations. For example, a low-frequency mode may use low-frequency radar signals (e.g., 76.5 GHZ) and a horizontally polarized antenna array to create the field-of-view 110 with a wide azimuth and a long range (e.g., configured for medium and long-range detections). The low-frequency mode may be used, for example, as an imaging radar. It should be noted that the low-frequency mode could use a single and/or vertically polarized antenna(s). Furthermore, the operating frequencies may vary without departing from the scope of this disclosure.

The waveguide 106 provides electromagnetic energy paths through the waveguide 106. The energy paths are formed by a feed portion 112 and a low-frequency portion 114. Thus, the waveguide 106 has a low-frequency energy path. Feed portion 112 contains a feed port 120 that is configured to interface with a transmitter/receiver (e.g., MMIC).

The low-frequency portion 114 contains a low-pass filter 122 and low-frequency antenna(s) 124. The low-pass filter 122 is configured to block high-frequency radar signals (or other signals) from entering the low-frequency portion 114 and ultimately from reaching the low-frequency antenna(s) 124.

Figure 2:
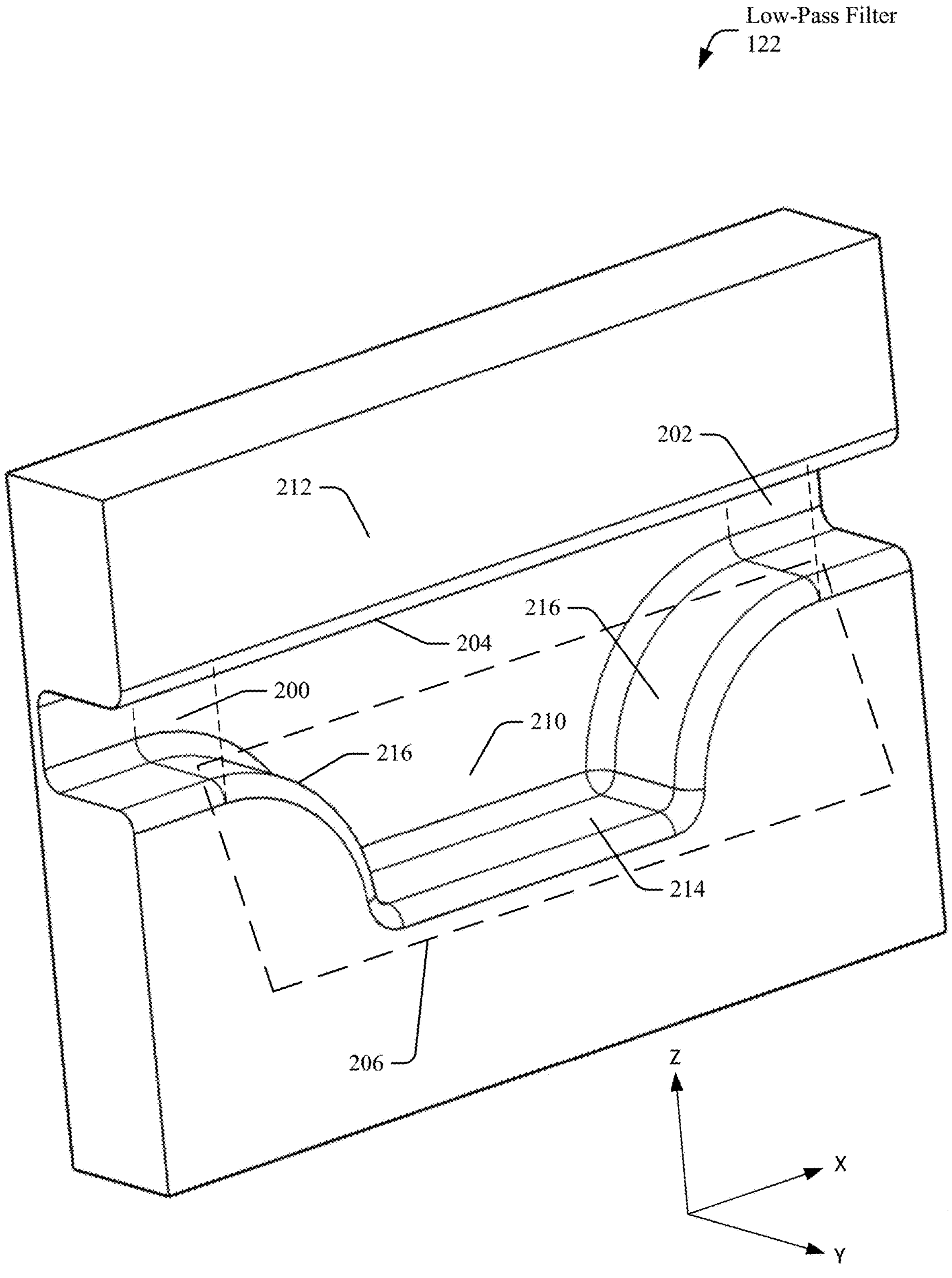
FIG. 2 illustrates, in accordance with this disclosure, a first example of a curved-wall low-pass filter.
Figure 3:
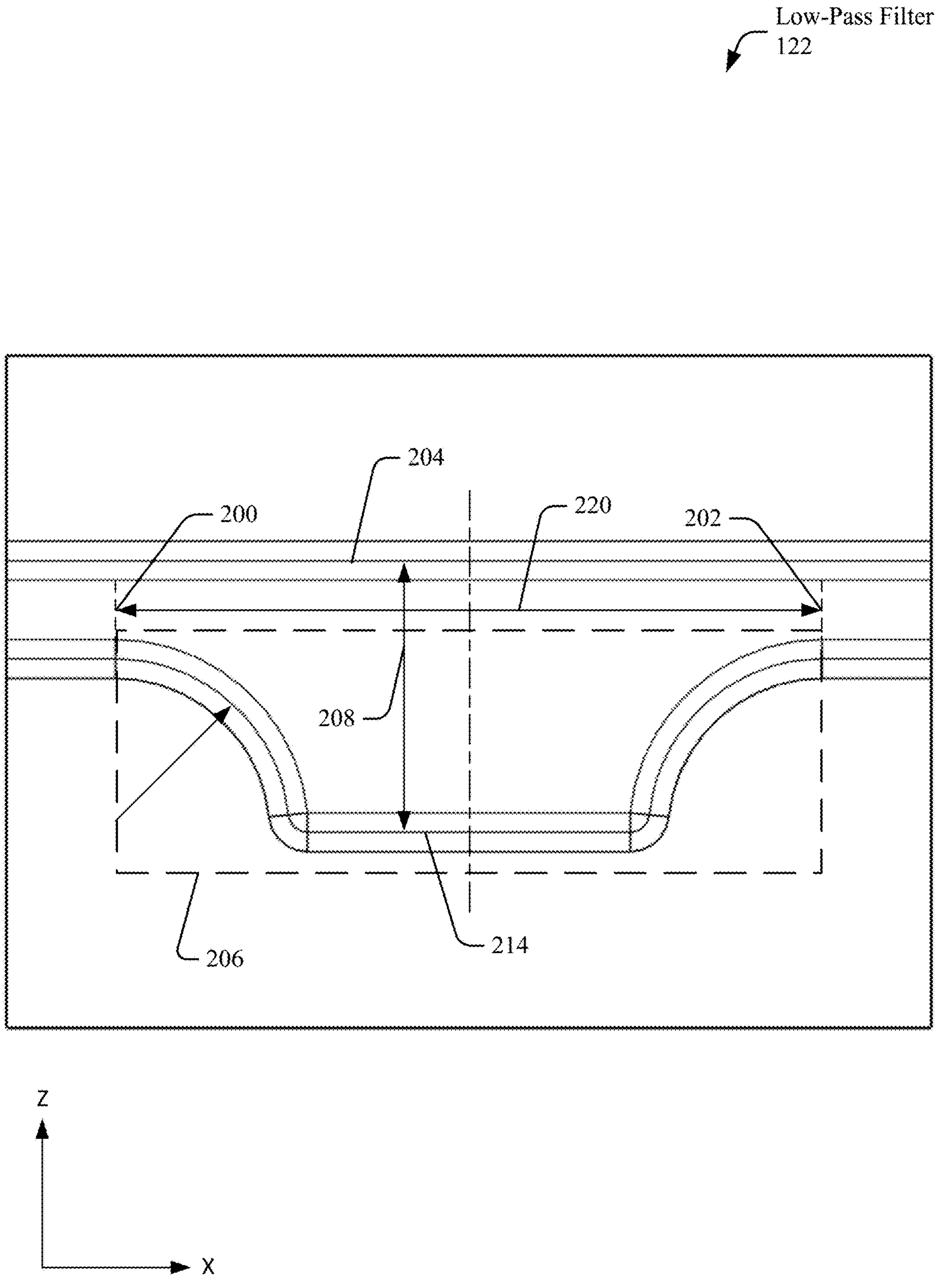
FIG. 3 illustrates, in accordance with this disclosure, another view of the first example of a curved-wall low-pass filter.

FIGS. 2 and 3 illustrate a first example of the low-pass filter 122. In the first example, the low-pass filter 122 has a filter input port 200 and a filter output port 202. Between the filter input port 200 and the filter output port 202 are a top wall 204 and a bottom wall 206. The bottom wall 206 is opposite the top wall 204 and forms a greater depth 208 (e.g., in the z direction) than either of the filter input port 200 or the filter output port 202. An area between the filter input port 200 the filter output port 202 forms a cavity 210.

Half of the low-pass filter 122 (and the associated components) is shown, with the rest of the low-pass filter 122 being a mirror image about a separation plane 212. By using symmetry, the waveguide 106 may be easily manufacturable (e.g., in two pieces) with minimal signal loss through the separation plane 212.

It should also be noted that the edges are filleted for ease of manufacturing. The edges may also be squared (or chamfered) without departing from the scope of this disclosure.

In the illustrated example, bottom wall 206 comprises a flat portion 214 and curved portions 216. The flat portion 214 may be parallel to the top wall 204 and be between the curved portions 216. The curved portions 216 may be cylindrical in shape (e.g., having a constant radius) or non-cylindrical in shape (e.g., having a varying radius). The curved portions 216 may be convex from the perspective of cavity 210. In other words, cavity 210 may have a wider profile (e.g., in the x direction) near the filter input port 200 and the filter output port 202 than toward the flat portion 214.

The curved portions 216 may meet the filter input port 200 and the filter output port 202 at tangent angles (e.g., be parallel) and the flat portion 214 at or near perpendicular angles. Depending on the radius(es) used and the dimensions of the low-pass filter 122, the curved portions 216 may meet the flat portion 214 at non-perpendicular angles. The transition from the curved portions 216 to the flat portion 214 may be filleted (as shown), chamfered with smaller radius fillets, chamfered with edges, or along an edge (e.g., not filleted or chamfered).

The greater depth 208 may be less than half a length 220 (e.g., in the x direction) of the cavity 210 between the filter input port 200 and the filter output port 202. The length 220 may be less than two times an operating wavelength (e.g., of the low-frequency portion 114).

The filter input port 200 and the filter output port 202 may have similar or different dimensions. For example, the top wall 204 may have a jog that causes the filter output port 202 to have a lesser depth than the filter input port 200. The jog may have a flat portion that is angled relative to other portions of the top wall 204 or be a smooth curve. Furthermore, the jog may be centered between the filter input port 200 and the filter output port 202 or be offset. For example, the jog may be offset towards the filter input port 200 or the filter output port 202. The jog may be configured to widen the rejection band of the low-pass filter 122.

Figure 4:
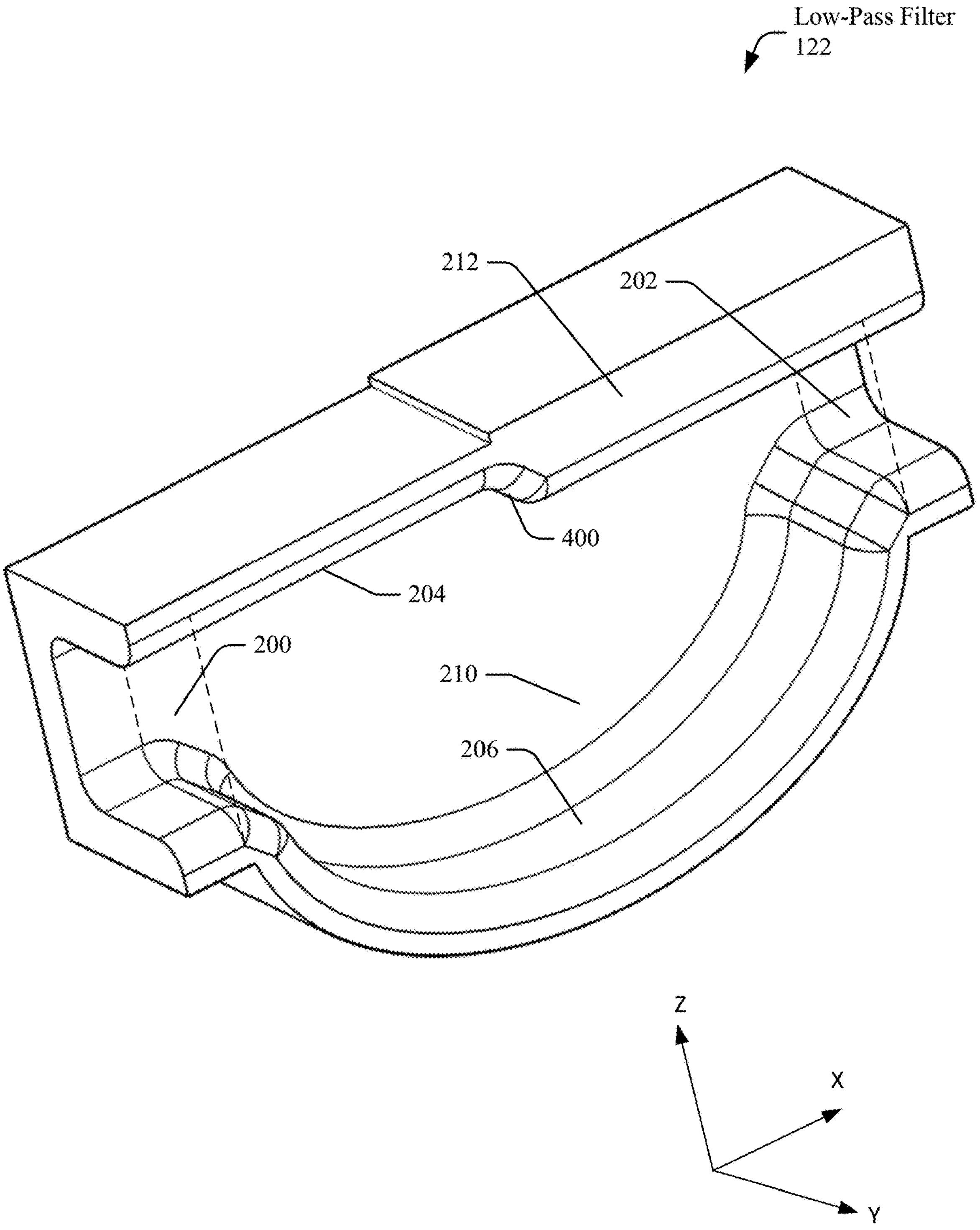
FIG. 4 illustrates, in accordance with this disclosure, a second example of a curved-wall low-pass filter.
Figure 5:
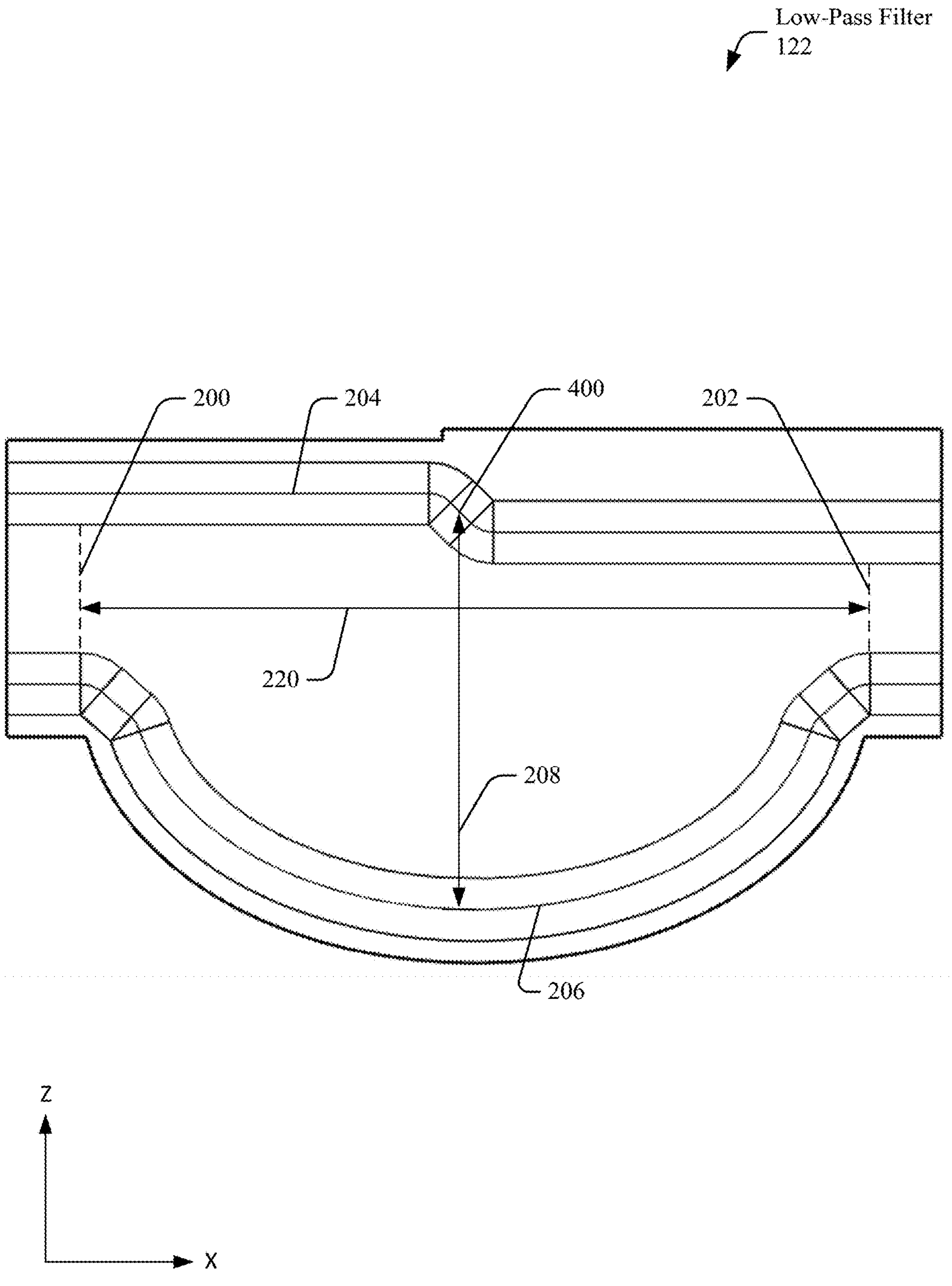
FIG. 5 illustrates, in accordance with this disclosure, another view of the second example of a curved-wall low-pass filter.

FIGS. 4 and 5 illustrate a second example of the low-pass filter 122. In the second example, the low-pass filter 122 has the filter input port 200 and the filter output port 202. Between the filter input port 200 and the filter output port 202 are the top wall 204 and the bottom wall 206. The bottom wall 206 is opposite the top wall 204 and forms the greater depth 208 (e.g., in the z direction) than either of the filter input port 200 or the filter output port 202. An area between the filter input port 200 the filter output port 202 forms the cavity 210.

Half of the low-pass filter 122 (and the associated components) is shown, with the rest of the low-pass filter 122 being a mirror image about the separation plane 212. By using symmetry, the waveguide 106 may be easily manufacturable (e.g., in two pieces) with minimal signal loss through the separation plane 212.

It should also be noted that the edges are filleted for ease of manufacturing. The edges may also be squared (or chamfered) without departing from the scope of this disclosure.

In the illustrated example, bottom wall 206 comprises a single curved surface (minus transitions to the filter input port 200 and the filter output port 202. The bottom wall 206 may be elliptical in shape (as shown).

The bottom wall 206 may meet the filter input port 200 and the filter output port 202 at or near right angles. Depending on the elliptical dimensions used and the dimensions of the low-pass filter 122, the bottom wall 206 may meet the filter input port 200 and the filter output port 202 at non-right angles. The transition from the bottom wall 206 to the filter input port 200 and the filter output port 202 may be filleted, chamfered with smaller radius fillets (as shown), chamfered with edges, or along an edge (e.g., not filleted or chamfered).

The greater depth 208 may be less than half a length 220 (e.g., in the x direction) of the cavity 210 between the filter input port 200 and the filter output port 202. The length 220 may be less than two times an operating wavelength (e.g., of the low-frequency portion 114).

The filter input port 200 and the filter output port 202 may have similar or different dimensions. For example, the top wall 204 may have the jog 400 (as illustrated) that causes the filter output port 202 to have a lesser depth than the filter input port 200. The jog 400 may have a flat portion (as shown) that is at an angle relative to the rest of the top wall 204 or be a smooth curve. Furthermore, the jog 400 may be centered between the filter input port 200 and the filter output port 202 or be offset (as shown). For example, the jog may be offset towards the filter input port 200 (as shown) or towards the filter output port 202. The jog 400 may be configured to widen the rejection band of the low-pass filter 122.

Figure 6:
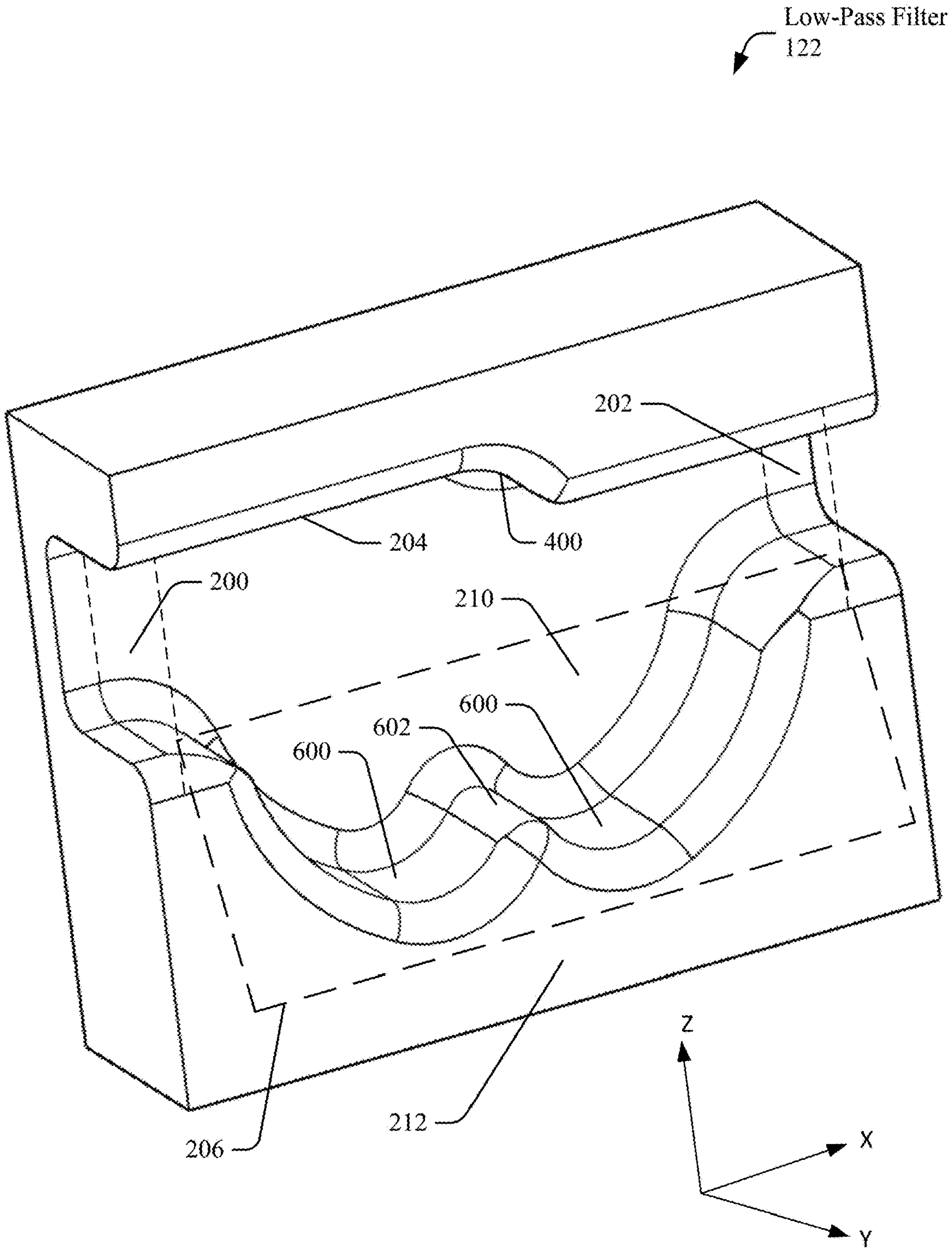
FIG. 6 illustrates, in accordance with this disclosure, a third example of a curved-wall low-pass filter.
Figure 7:
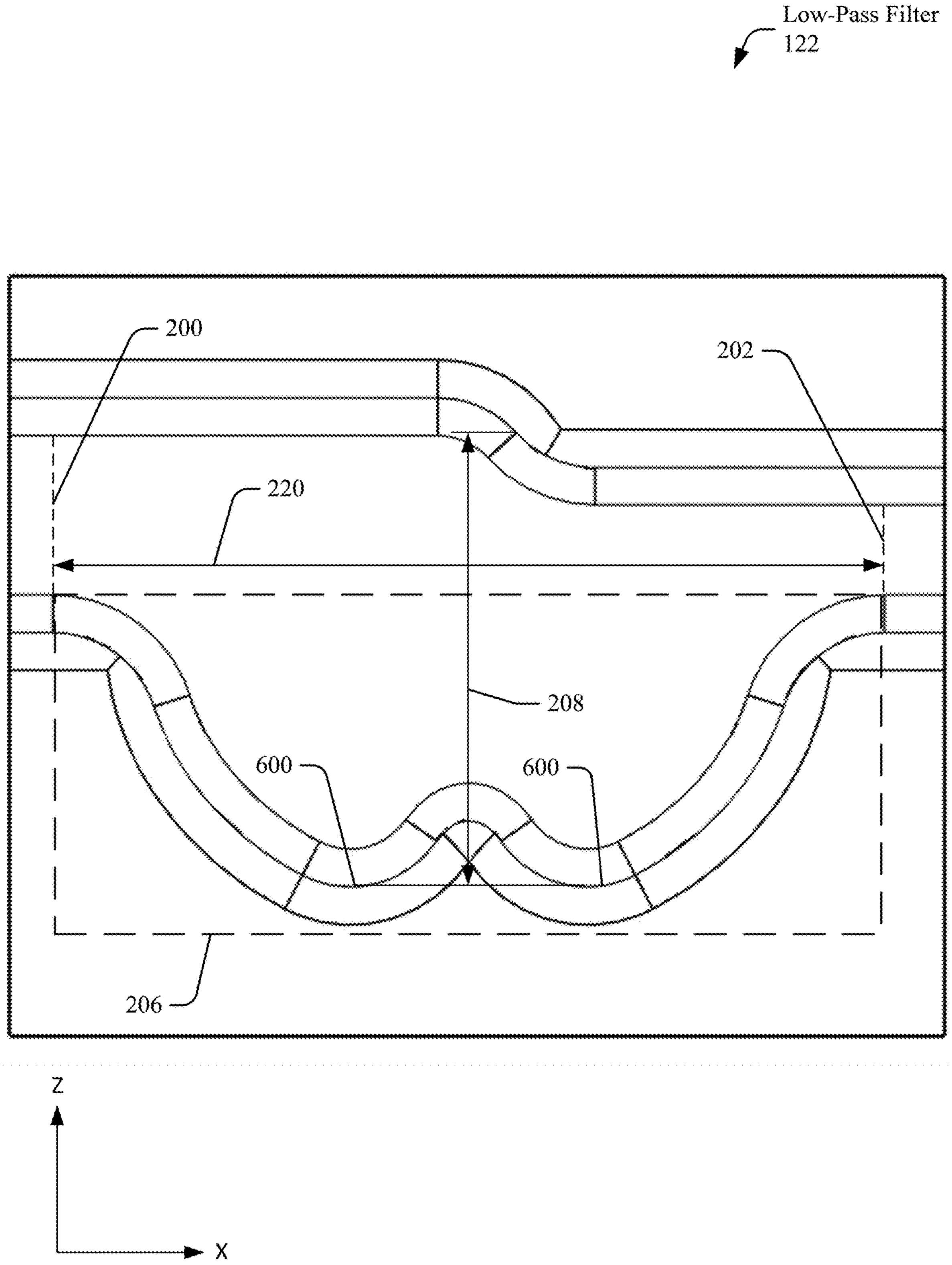
FIG. 7 illustrates, in accordance with this disclosure, another view of the third example of a curved-wall low-pass filter.

FIGS. 6 and 7 illustrate a third example of the low-pass filter 122. In the third example, the low-pass filter 122 has the filter input port 200 and the filter output port 202. Between the filter input port 200 and the filter output port 202 are the top wall 204 and the bottom wall 206. The bottom wall 206 is opposite the top wall 204 and forms a greater depth 208 (e.g., in the z direction) than either of the filter input port 200 or the filter output port 202. An area between the filter input port 200 the filter output port 202 forms the cavity 210.

Half of the low-pass filter 122 (and the associated components) is shown, with the rest of the low-pass filter 122 being a mirror image about the separation plane 212. By using symmetry, the waveguide 106 may be easily manufacturable (e.g., in two pieces) with minimal signal loss through the separation plane 212.

It should also be noted that the edges are filleted for ease of manufacturing. The edges may also be squared (or chamfered) without departing from the scope of this disclosure.

In the illustrated example, the bottom wall 206 comprises elliptical portions 600 that join in an extension portion 602. The extension portion 602 may extend toward the top wall 204. The height of the extension portion 602 (e.g., away from deepest extents of the elliptical portions 600) may vary without departing from the scope of this disclosure. The elliptical portions 600 may be convex from the perspective of cavity 210. In other words, cavity 210 may have a wider profile (e.g., in the x direction) near the filter input port 200 and the filter output port 202 than toward extents of the elliptical portions 600 away from the top wall 204.

The bottom wall 206 may meet the filter input port 200 and the filter output port 202 at or near right angles. Depending on the elliptical dimensions used and the dimensions of the low-pass filter 122, the bottom wall 206 may meet the filter input port 200 and the filter output port 202 at non-right angles. The transition from the bottom wall 206 to the filter input port 200 and the filter output port 202 may be filleted (as shown), chamfered with smaller radius fillets, chamfered with edges, or along an edge (e.g., not filleted or chamfered).

The greater depth 208 (e.g., from the top wall 204 to deepest extents of the elliptical portions 600) may be less than half a length 220 (e.g., in the x direction) of the cavity 210 between the filter input port 200 and the filter output port 202. The length 220 may be less than two times an operating wavelength (e.g., of the low-frequency portion 114).

The filter input port 200 and the filter output port 202 may have similar or different dimensions. For example, the top wall 204 may have the jog 400 (as illustrated) that causes the filter output port 202 to have a lesser depth than the filter input port 200. The jog 400 may have a flat portion that is at an angle relative to the rest of the top wall 204 or be a smooth curve (as shown). Furthermore, the jog 400 may be centered between the filter input port 200 and the filter output port 202 or be offset (as shown). For example, the jog may be offset towards the filter input port 200 or towards the filter output port 202 (as shown). The jog 400 may be configured to widen the rejection band of the low-pass filter 122.

FIG. 8 illustrates an example method 800 of forming and implementing a waveguide with a curved-wall low-pass filter. The order in which the operations are shown and/or described is not intended to be construed as a limitation, and the order may be rearranged without departing from the scope of this disclosure. Furthermore, any number of the operations can be combined with any other number of the operations to implement the example process flow or an alternate process flow.

At step 802, a waveguide comprising a curved-wall low-pass filter is formed. For example, waveguide 106 may be formed such that it contains low-pass filter with the cavity.

The waveguide 106 may be formed of one or more pieces. For example, the waveguide 106 may be formed of multiple pieces that are adhered or bonded together (e.g., along a center plane). To do so, one or more pieces of the waveguide 106 may be formed using computer numeric control (CNC), injection molding, casting, machining, or any other manufacturing process and may be formed of metal or plastic. As part of forming the waveguide 106, surfaces of the waveguide 106 may be metallicized (e.g., if the waveguide 106 is formed of a non-conductive material). When formed of multiple pieces, the pieces may be glued/bonded (using a non-conductive adhesive), bolted, screwed (e.g., using one or more screws), snapped (e.g., using one or more snaps), welded, clamped using one or more clamps, press-fit, or any other assembly process known by those of ordinary skill in the art to form the waveguide 106.

At step 804, waveguide 106 is integrated into a radar system of a vehicle. For example, the waveguide 106 may be integrated within the radar system 102 of the vehicle 104.

At step 806, the waveguide is utilized to detect objects in an environment of the vehicle. For example, the low-pass filter 122 may be utilized as part of the low-frequency portion 114 to detect objects at far ranges and wide azimuth angles (e.g., field-of-view 110A).

EXAMPLES

Example 1: A waveguide comprising: a low-pass filter portion configured to allow low-frequency electromagnetic energy therethrough and reject high-frequency electromagnetic energy, the low-pass filter portion comprising: an input port; an output port; and a cavity feature formed between the input port and the output port, the cavity feature having a greater depth than respective depths of the input port and the output port, the cavity feature comprising: a top wall; and a bottom wall, disposed opposite the top wall, that achieves the greater depth for the cavity feature, the bottom wall comprising at least one curved portion configured to allow the cavity feature to achieve the allowance of the low-frequency electromagnetic energy and the rejection of the high-frequency electromagnetic energy.

Example 2: The waveguide of example 1, wherein a length of the cavity feature between the input port and the output port is less than two times an operating wavelength.

Example 3: The waveguide of example 1, wherein the greater depth of the cavity feature is approximately an operating wavelength.

Example 4: The waveguide of example 1, wherein the greater depth of the cavity feature is approximately half a length of the cavity feature.

Example 5: The waveguide of example 1, wherein the input port and the output port have different depths.

Example 6: The waveguide of example 5, wherein the top wall comprises a jog feature between two parallel portions.

Example 7: The waveguide of example 6, wherein the jog feature is halfway between the input port and the output port.

Example 8: The waveguide of example 1, wherein the bottom wall further comprises: a flat portion that is parallel to at least a portion of the top wall, the flat portion providing the greater depth; a first curved portion that connects the input port to the flat portion; and a second curved portion that connects the output port to the flat portion.

Example 9: The waveguide of example 8, wherein the first curved portion and the second curved portion are cylindrical.

Example 10: The waveguide of example 9, wherein: a first end of the first curved portion is tangent with the input port; and a second end of the second curved portion is tangent with the output port.

Example 11: The waveguide of example 9, wherein: a second end of the first curved portion is substantially normal with the flat portion; and a first end of the second curved portion is substantially normal with the flat portion.

Example 12: The waveguide of example 1, wherein the bottom wall is elliptical to form the greater depth.

Example 13: The waveguide of example 12, wherein: a first end of the bottom wall is substantially normal with the input port; and a second end of the bottom wall is substantially normal with the output port.

Example 14: The waveguide of example 1, wherein the bottom wall comprises a first elliptical portion and a second elliptical portion, the first and second elliptical portions forming the greater depth.

Example 15: The waveguide of example 14, wherein: a first end of the first elliptical portion is substantially normal with the input port; and a second end of the second elliptical portion is substantially normal with the output port.

Example 16: The waveguide of example 14, wherein the first elliptical portion and the second elliptical portion meet forming an extension portion that extends towards the top wall away from the greater depth.

Example 17: The waveguide of example 16, wherein the extension portion extends less than half a distance from a bottom extent of the bottom wall to the input port or output port.

Example 18: A system comprising: a processor configured to generate low-frequency electromagnetic energy; and a waveguide configured to guide the low-frequency electromagnetic energy, the waveguide comprising: a low-pass filter portion configured to allow low-frequency electromagnetic energy therethrough and reject high-frequency electromagnetic energy, the low-pass filter portion comprising: an input port; an output port; and a cavity feature formed between the input port and the output port, the cavity feature having a greater depth than respective depths of the input port and the output port, the cavity feature comprising: a top wall; and a bottom wall, disposed opposite the top wall, that achieves the greater depth for the cavity feature, the bottom wall comprising at least one curved portion configured to allow the cavity feature to achieve the allowance of the low-frequency electromagnetic energy and the rejection of the high-frequency electromagnetic energy.

Example 19: The system of example 18, wherein the bottom wall is elliptical to form the greater depth.

Example 20: The system of example 18, wherein the bottom wall comprises a first elliptical portion and a second elliptical portion, the first and second elliptical portions forming the greater depth.

Conclusion

While various implementations/embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A waveguide comprising:

a low-pass filter portion configured to allow low-frequency electromagnetic energy therethrough and reject high-frequency electromagnetic energy, the low-pass filter portion comprising:

an input port;

an output port; and a cavity feature formed between the input port and the output port, the cavity feature having a greater depth than respective depths of the input port and the output port, the cavity feature comprising:

a top wall; and a bottom wall, disposed opposite the top wall, that achieves the greater depth for the cavity feature, the bottom wall comprising at least one curved portion configured to allow the cavity feature to achieve the allowance of the low-frequency electromagnetic energy and the rejection of the high-frequency electromagnetic energy, wherein the at least one curved portion of the bottom wall comprises a curved surface extending from the input port or the output port to an inner bottom planar surface of the bottom wall, and wherein the curved surface is convex relative to the cavity feature.

2. The waveguide of claim 1, wherein a length of the cavity feature between the input port and the output port is less than two times an operating wavelength.

3. The waveguide of claim 1, wherein the greater depth of the cavity feature is approximately an operating wavelength.

4. The waveguide of claim 1, wherein the greater depth of the cavity feature is approximately half a length of the cavity feature.

5. A system comprising:

the waveguide of claim 1; and a processor configured to generate the low-frequency electromagnetic energy.

6. The waveguide of claim 1, wherein the bottom wall further comprises a flat portion that is parallel to at least a portion of the top wall, the flat portion providing the greater depth, wherein:

the curved surface extends from the input port to the inner bottom planar surface of the bottom wall;

the at least one curved portion of the bottom wall comprises another curved surface extending from the inner bottom planar surface of the bottom wall to the output port; and the another curved surface is convex relative to the cavity feature.

7. The waveguide of claim 6, wherein the low-pass filter portion comprises a planar side wall extending from the bottom wall to the top wall.

8. A waveguide comprising:

a low-pass filter portion configured to allow low-frequency electromagnetic energy therethrough and reject high-frequency electromagnetic energy, the low-pass filter portion comprising:

an input port;

an output port, wherein the input port and the output port have different depths, and a cavity feature formed between the input port and the output port, the cavity feature having a greater depth than respective depths of the input port and the output port, the cavity feature comprising:

a top wall; and a bottom wall, disposed opposite the top wall, that achieves the greater depth for the cavity feature, the bottom wall comprising at least one curved portion configured to allow the cavity feature to achieve the allowance of the low-frequency electromagnetic energy and the rejection of the high-frequency electromagnetic energy.

9. The waveguide of claim 8, wherein the top wall comprises i) a planar surface extending from the input port to the output port, or ii) a jog feature between two parallel portions.

10. The waveguide of claim 9, wherein:

the top wall comprises the jog feature; and the jog feature is halfway between the input port and the output port.

11. A waveguide comprising:

a low-pass filter portion configured to allow low-frequency electromagnetic energy therethrough and reject high-frequency electromagnetic energy, the low-pass filter portion comprising:

an input port;

an output port; and a cavity feature formed between the input port and the output port, the cavity feature having a greater depth than respective depths of the input port and the output port, the cavity feature comprising:

a top wall; and a bottom wall, disposed opposite the top wall, that achieves the greater depth for the cavity feature, the bottom wall comprising at least one curved portion configured to allow the cavity feature to achieve the allowance of the low-frequency electromagnetic energy and the rejection of the high-frequency electromagnetic energy, wherein the low-pass filter portion comprises a planar side wall extending from the bottom wall to the top wall, and the at least one curved portion of the bottom wall is concave relative to the cavity feature and either i) comprises a curved surface extending from the input port to the output port, or ii) comprises a plurality of curved surfaces extending in series from the input port to the output port, each of the plurality of curved surfaces being concave relative to the cavity feature.

12. The waveguide of claim 11, wherein the bottom wall comprises a first elliptical portion and a second elliptical portion, the first and second elliptical portions forming the greater depth.

13. The waveguide of claim 12, wherein:

a first end of the first elliptical portion is substantially normal with the input port; and a second end of the second elliptical portion is substantially normal with the output port.

14. The waveguide of claim 12, wherein the first elliptical portion and the second elliptical portion meet forming an extension portion that extends towards the top wall away from the greater depth.

15. The waveguide of claim 14, wherein the extension portion extends less than half a distance from a bottom extent of the bottom wall to the input port or the output port.

16. The waveguide of claim 11, wherein:

a first end of the bottom wall is substantially normal with the input port; and a second end of the bottom wall is substantially normal with the output port.

* * * * *